United States Patent
Ji et al.

(10) Patent No.: US 11,785,172 B2
(45) Date of Patent: Oct. 10, 2023

(54) STATIC IDENTIFICATION AREA DETECTING METHOD AND MODULE, CHIP, ELECTRONIC DEVICE AND MEDIUM

(71) Applicant: AMLOGIC (SHANGHAI) CO., LTD, Shanghai (CN)

(72) Inventors: Tao Ji, Shanghai (CN); Zhihong He, Shanghai (CN); Chun Wang, Shanghai (CN); Dongjian Wang, Shanghai (CN); Xuyun Chen, Shanghai (CN)

(73) Assignee: AMLOGIC (SHANGHAI) CO., LTD, Shanghai (CN)

( * ) Notice: Subject to any disclaimer, the term of this patent is extended or adjusted under 35 U.S.C. 154(b) by 173 days.

(21) Appl. No.: 17/304,921

(22) Filed: Jun. 28, 2021

(65) Prior Publication Data

US 2021/0407102 A1 Dec. 30, 2021

(30) Foreign Application Priority Data

Jun. 30, 2020 (CN) .......................... 202010615733.1

(51) Int. Cl.
| | |
|---|---|
| H04N 5/14 | (2006.01) |
| G06T 7/215 | (2017.01) |
| G06T 7/254 | (2017.01) |
| G06V 20/40 | (2022.01) |
| H04N 7/01 | (2006.01) |
| G06F 18/22 | (2023.01) |
| G06V 10/24 | (2022.01) |

(52) U.S. Cl.
CPC ............. *H04N 5/144* (2013.01); *G06F 18/22* (2023.01); *G06T 7/215* (2017.01); *G06T 7/254* (2017.01); *G06V 10/24* (2022.01); *G06V 20/46* (2022.01); *G06V 20/49* (2022.01); *H04N 7/0127* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 2008/0316359 A1* | 12/2008 | Kim | ....................... | H04N 5/144 348/571 |
| 2012/0177249 A1* | 7/2012 | Levy | ..................... | G06V 20/46 382/103 |
| 2013/0051473 A1* | 2/2013 | Chen | .................... | H04N 19/533 375/E7.125 |
| 2014/0010302 A1* | 1/2014 | Ahuja | .................... | H04N 19/51 375/240.16 |
| 2020/0007817 A1* | 1/2020 | Diggins | ................. | G06V 20/40 |
| 2021/0021833 A1* | 1/2021 | Hong | ................... | H04N 19/137 |

FOREIGN PATENT DOCUMENTS

CN 114187333 A * 3/2022

* cited by examiner

*Primary Examiner* — Delomia L Gilliard
(74) *Attorney, Agent, or Firm* — Lorenz & Kopf LLP

(57) ABSTRACT

A static identification area detecting method and module, chip, electronic device and medium, which can improve the accuracy of static identification area detection.

18 Claims, 5 Drawing Sheets

STATIC IDENTIFICATION AREA DETECTING METHOD AND MODULE, CHIP, ELECTRONIC DEVICE AND MEDIUM

CROSS-REFERENCE TO RELATED APPLICATION

This application claims priority to Chinese Patent Application No. 202010615733.1, filed Jun. 30, 2020, which is incorporated in its entirety by reference.

TECHNICAL FIELD

The present invention relates to the field of image recognition technology, and in particular, to a static identification area detecting method and module, chip, electronic device and medium.

BACKGROUND

In general, Frame Rate Conversion (FRC) can be performed in a Personal Computer (PC) or High Definition Television (HDTV) in order to be compatible between programs with various broadcast signal standards such as PAL or National Television System Committee (NTSC).

Frame rate conversion refers to the conversion of the number of frames output per second, and is intended to solve the problem of poor visual effects during motion picture playback, in particular, when the frame rate is increased, it may be necessary to insert a new frame, called an inserted frame. To generate the inserted frame, Motion Estimation (ME) can be used. Motion estimation can consist of searching for the most similar block between the previous frame and the current frame. The Motion Vector (MV) can represent the magnitude of the block motion during motion estimation.

In the process of frame rate conversion, it is generally necessary to separate the static identification areas in the image. However, the existing methods for detecting static identification areas in video images have the problem of low detection accuracy.

SUMMARY

The problem solved by the present invention is to provide a static identification area detecting method to improve the accuracy of static identification area detection.

To solve the above problem, the present invention provides a static identification area detecting method, the method includes:
  determining a corresponding first image block in the image frame to be detected, centered on each pixel point in the image frame to be detected, respectively, and determining a corresponding co-located image block in the next image frame of the image frame to be detected, centered on the co-located pixel point in the next image frame of the image frame to be detected; the coordinate position of the co-located pixel point in the next image frame is the same as the coordinate position of the pixel point in the image frame to be detected;
  searching for image blocks similar to the corresponding first image block in the previous image frame and the next image frame of the image frame to be detected, and searching for image blocks similar to the corresponding co-located image in the image frame to be detected, as the corresponding first similar image block, second similar image block and third similar image block, respectively;
  calculating the first motion vector of the corresponding first image block pointing to the corresponding first similar image block and the second motion vector of the corresponding first image block pointing to the corresponding second similar image block, respectively, and calculating the third motion vector of the corresponding co-located image block pointing to the corresponding third similar image block.
  determining whether the corresponding pixel point in the image frame to be detected is a pixel point within the static identification area based on the corresponding first similar image block, second similar image block and third similar image block and the corresponding first motion vector, second motion vector and third motion vector.

Optionally, after determining the reliability or not of the similarity calculation of the corresponding first similar image block, second similar image block and third similar image block and the motion vector calculation of the first motion vector, second motion vector and third motion vector and the consistency or not of the direction of the corresponding first motion vector, second motion vector and third motion vector, the method further includes:
  setting a local confidence identification for the corresponding pixel point in the image frame to be detected based on the information on the reliability of the similarity calculation of the corresponding first similar image block, second similar image block and third similar image block and the reliability of the motion vector calculation of the corresponding first motion vector, second motion vector and third motion vector, and the information on the consistency of the motion vector direction of the corresponding first motion vector, second motion vector and third motion vector.
  determining the corresponding second image block in the image frame to be detected, centered on the corresponding pixel point;
  calculating the local confidence information of the corresponding pixel point relative to the corresponding second image block based on the local confidence identification of ail pixel points within the corresponding second image block, the local confidence information is used to identify information on the consistency of the corresponding pixel point with other pixel points within the corresponding second image in the time domain and spatial domain;
  determining whether the pixel point in the image frame to be detected is a pixel point within the static identification area based on the calculated local confidence information of the corresponding pixel point relative to the corresponding second image block.

Accordingly, embodiments of the present invention also provide a static identification area detection module, including:
  a determination unit, adapted to determine the corresponding first image block in the image frame to be detected, centered on each pixel point in the image frame to be detected, and to determine the corresponding co-located image block in the next image frame of the image frame to be detected, centered on the co-located pixel point in the next image frame of the image frame to be detected; the coordinate position of the co-located pixel point in the next image frame is the same as the coordinate position of the pixel point in the image frame to be detected;

a search unit, adapted to search for image blocks similar to the corresponding first image block in the previous image frame and next image frame and to search for image block similar to the corresponding co-located image block in the image frame to be detected as the corresponding first similar image block, second similar image block and third similar image block, respectively;

a calculation unit, adapted to calculate a first motion vector of the corresponding first image block pointing to the corresponding first similar image block and a second motion vector of the corresponding first image block pointing to the corresponding second similar image block, and to calculate a third motion vector of the corresponding co-located image block pointing to the corresponding third similar image block, respectively;

a detection unit, adapted to determine whether the corresponding pixel point in the image frame to be detected is a pixel point within the static identification area based on the corresponding first similar image block, second similar image block and third similar image block and the corresponding first motion vector, second motion vector and third motion vector.

Accordingly, embodiments of the present invention also provide a chip on which the above-mentioned detection module is integrated.

Accordingly, embodiments of the present invention further provide a device comprising at least one memory and at least one processor, the memory storing one or more computer instructions, wherein the one or more computer instructions are executed by the processor to implement the detecting method as described in any one of the above.

Accordingly, embodiments of the present invention further provide a storage medium, the storage medium storing one or more computer instructions, the one or more computer instructions are used to implement the detecting method as described in any one of the above.

Compared with the prior art the technical solution of the present invention has the following advantages:

The static identification area detecting method in the embodiment of the present invention: determining a corresponding first image block in the image frame to be detected, centered on each pixel point in the image frame to be detected, and determining a corresponding similar image block in the next image frame of the image frame to be detected, centered on the same pixel in the next image frame of the image frame to be detected; searching for image blocks similar to the corresponding first image block in the previous image frame and next image frame, and searching for the image block similar to the corresponding co-located image block in the image frame to be detected as the corresponding first similar image block, second similar image block and third similar image block, respectively; calculating the first motion vector of the corresponding first image block pointing to the corresponding first similar image block and the second motion vector of the corresponding first image block pointing to the corresponding second similar image block, respectively, and calculating the third motion sector of the corresponding co-located image block pointing to the corresponding third similar image block; determining whether the corresponding pixel point in the image frame to be detected is a pixel point within the static identification area based on the corresponding first similar image block, the second similar image block and the third similar image block and the corresponding first motion vector, second motion vector and third motion vector. Since the corresponding first similar image block, second similar image block and third similar image block and the corresponding first motion vector, second motion vector and third motion vector could be used to determine the consistency information of the corresponding pixel points in the image frame to be detected in the time domain and the spatial domain of the front and rear frames of the video, the accuracy of the static identification area identification could be improved.

Further, after determining whether the similarity calculation of the corresponding first similar image block, second similar image block and third similar image block is reliable, or whether the calculation of the corresponding first motion vector, second motion vector and third motion vector is reliable, or whether the direction of the corresponding first motion vector, second motion vector and third motion s vector is consistent, the method further includes, setting a corresponding local confidence identification for the pixel point in the image frame to be detected based on the information on the reliability of the similarity calculation of the corresponding first similar image block, second similar image block and third similar image block and the reliability of the motion vector calculation of the corresponding first motion vector, second motion vector and third motion vector, as well as the information on the consistency of the motion vector direction of the corresponding first motion vector, second motion vector and third motion vector; determining the corresponding second image block in the image frame to be detected centered on the corresponding pixel point, calculating the local confidence information of the corresponding pixel point relative to the corresponding second image block based on the local confidence identification of all pixel points within the corresponding second image block, the local confidence information is used to identify the local confidence of the corresponding pixel point relative to other pixel points within the corresponding second image in the time domain and spatial domain; determining whether the pixel point in the image frame to be detected is a pixel point in the static identification area based on the calculated local confidence information of the corresponding pixel point relative to the corresponding second image block. The accuracy of the static identification area identification can be further improved because the local confidence information can be used to identify the information of the consistency of the corresponding pixel point and other pixel points in the corresponding second image in the time domain and spatial domain.

DETAILED DESCRIPTION

Figure 1:
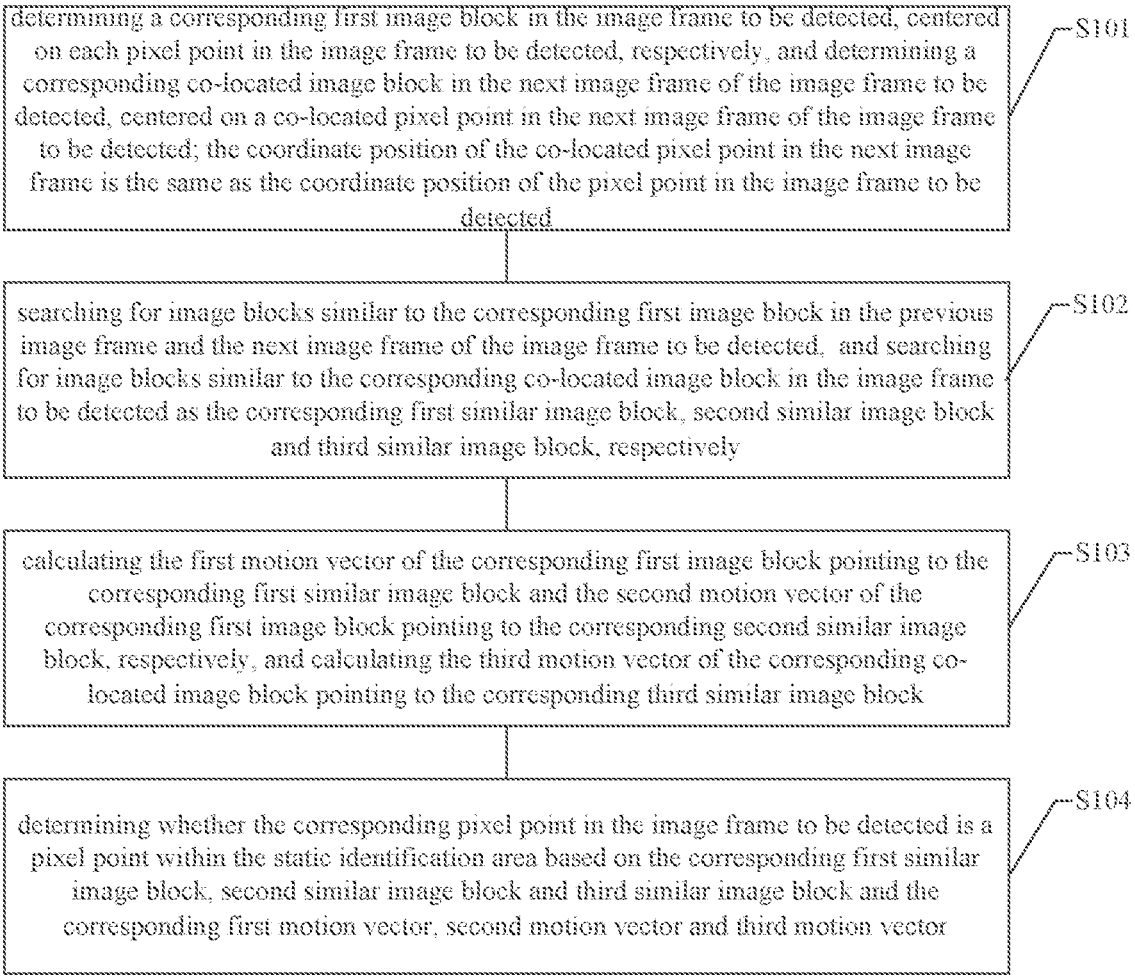
FIG. 1 shows a flow diagram of a static identification area detecting method in an embodiment of the present invention.

It can be known from the background technology, there is a problem of low detection accuracy in the existing static identification area detecting method.

According to different states of motion, the objects in the video image frame can generally be divided into static objects and moving objects. Among them, static objects are objects in a static state of the video image frame, such as background objects, text subtitles, etc.; motion objects are objects in a moving state of the video image frame, such as moving vehicles, running people, etc.

Static identification belongs to one of the static objects in a video image frame, which includes such as station logos, subtitles or On-Screen Display (OSD) that are in a static state for a short or long time, at the top of the image in the presented video image.

However, existing static identification area detecting methods cannot accurately distinguish background objects from the static identification areas, and suffer from a low recognition accuracy.

To solve the above problem, the present invention provides a static identification area detecting method, comprising: determining a corresponding first image block in the image frame to be detected, centered on each pixel point in the image frame to be detected, and determining a corresponding collocated image block in the next image frame of the image frame to be detected, centered on the co-located pixel point in the next image frame of the image frame to be detected; searching for image blocks similar to the corresponding first image block in the previous image frame and the next image frame and searching for image blocks similar to the corresponding co-located image block in the image frame to be detected, as the corresponding first similar image block, second similar image block and third similar image block, respectively; calculating the first motion vector of the corresponding first image block pointing to the corresponding first similar image block and the second motion vector of the corresponding first image block pointing to the corresponding second similar image block, respectively and calculating the third motion vector of the corresponding co-located image block pointing to the corresponding third similar image block; determining whether the corresponding pixel point in the image frame to be detected is a pixel point in the static identification area based on the corresponding first similar image block, second similar image block and third similar image block and the corresponding first motion vector, second motion vector and third motion vector.

In the static identification area detecting method provided by the embodiment of the present invention, the corresponding first similar image block, second similar image block and third similar image block and the corresponding first motion vector, second motion vector and third motion vector could be used to determine the consistency information of the corresponding pixel points in the image frame to be detected in the time domain and spatial domain of the front and rear frames of the video, to identify the static identification area in the video image and improve the accuracy of the static identification area identification.

FIG. 1 shows a flowchart of a static identification area detecting method in an embodiment of the present invention. Referring to FIG. 1, a static identification area detecting method for detecting a static identification area in a video image may specifically include:

step S101, determining a corresponding first image block in the image frame to be detected, centered on each pixel point in the image frame to be detected, respectively, and determining a corresponding co-located image block in the next image frame of the image frame to be detected, centered on a co-located pixel point in the next image frame of the image frame to be detected; the coordinate position of the co-located pixel point in the next image frame is the same as the coordinate position of the pixel point in the image frame to be detected;

step S102, searching for image blocks similar to the corresponding first image block in the previous image frame and the next image frame of the image frame to be detected, and searching for image blocks similar to the corresponding co-located image block in the image frame to be detected as the corresponding first similar image block, second similar image block and third similar linage block, respectively;

Step S103, calculating the first motion vector of the corresponding first image block pointing to the corresponding first similar image block and the second motion vector of the corresponding first image block pointing to the corresponding second similar image block, respectively, and calculating the third motion vector of the corresponding co-located image block pointing to the corresponding third similar image block;

Step S104, determining whether the corresponding pixel point in the image frame to be detected is a pixel point within the static identification area based on the corresponding first similar image block, second similar image block find third similar image block and the corresponding first motion vector, second motion vector and third motion vector.

In the above solution, based on the first similar image block, second similar image block and third similar image block and the corresponding first motion vector, second motion vector and third motion vector, the consistency information of the corresponding pixel points in the image frame to be detected in the time and spatial domains can be determined, and the accuracy of the static identification area identification can be improved.

In order to make the above-mentioned purposes, features and advantages of the embodiments of the present invention more obvious and understandable, the specific embodiments of the present invention are described in detail below in conjunction with FIGS. 2 to 4.

Figure 2:
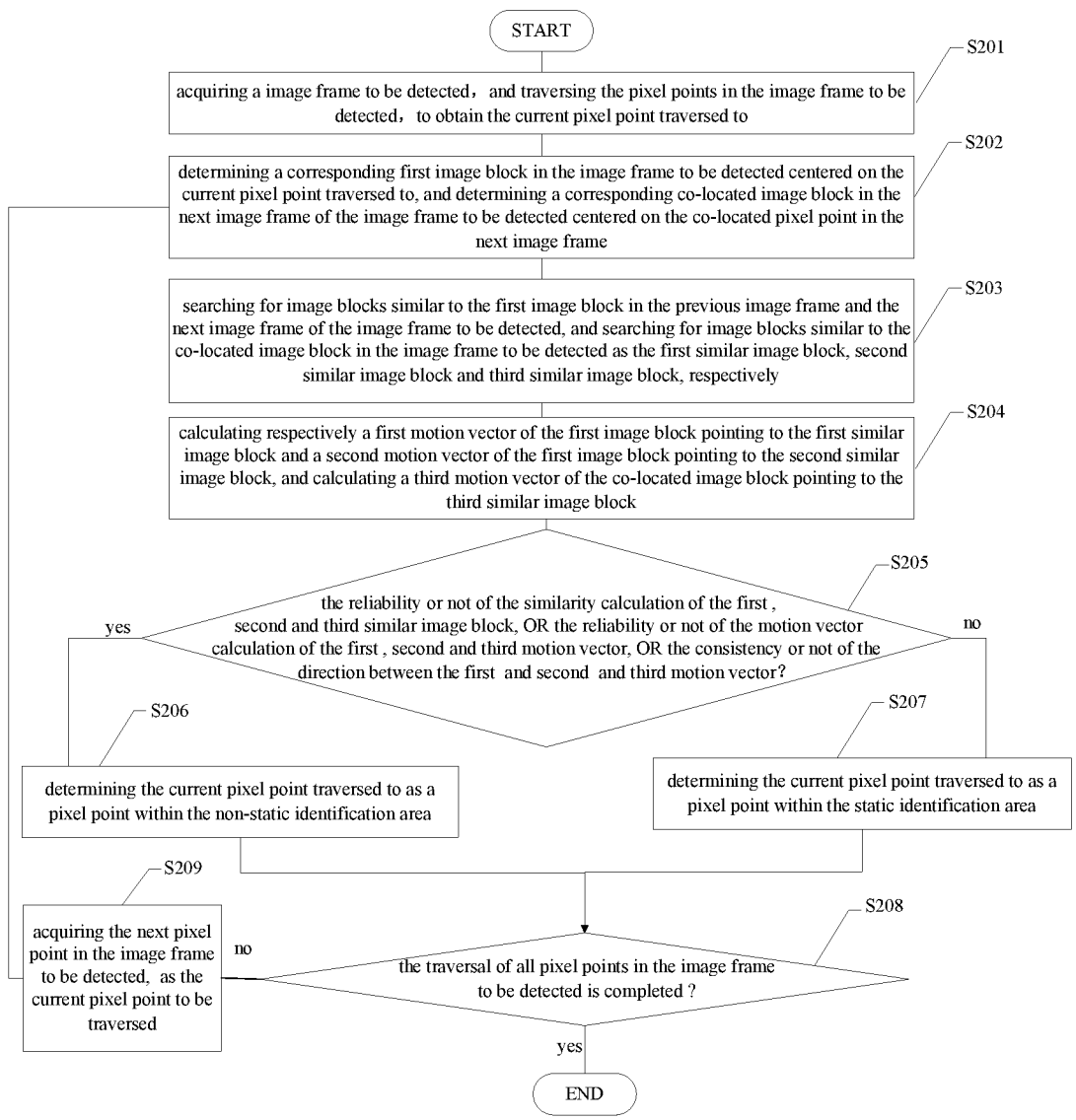
FIG. 2 shows a flow diagram of another static identification area detecting method in an embodiment of the present invention.

Please refer to FIG. 2, a static identification area detecting method in an embodiment of the present invention may specifically include the following steps:

step S201, acquiring a image frame to be detected, and traversing the pixel points in the image frame to be detected, to obtain the current pixel point traversed to.

For easy of description, the image frame to be detected is denoted as f(t), and the current pixel point to be traversed to in the image frame f(t) is denoted as f(x0, y0, t). Where t represents the time corresponding to the image frame to be detected, and x0 and y0 represent the horizontal axis (or x axis) and vertical axis (or y axis) coordinates of the current pixel point to be traversed to respectively.

Step S202, determining a corresponding first image block in the image frame to be detected centered on the current pixel point traversed to, and determining a corresponding co-located image block in the next image frame of the image frame to be detected centered on the co-located pixel point in the next image frame.

The previous image of the image frame f(t) to be detected is denoted as f(t−1), and the next image of the image frame f(t) to be detected is denoted as f(t+1).

The co-located pixel point is a pixel point in the next image frame f(t+1) with the same coordinate position as the current pixel point f(x0, y0, t) to be detected in the image frame f(t) to be detected, denoted as f(x0, y0, (t+1)).

The first image block is an image frame centered on the current pixel f(x0, y0, t) traversal to in the current image frame f(t) to be detected and its size is M*N (M and N are integers greater than 1), denoted as Block1 (t). Wherein, the size of the first image block Block1 (t), i.e., the values of M and N, can be set according to the requirements of computational complexity and accuracy, as long as the size of the first image block Block1 (t) set is less than the size of the image frame to be detected, without any limitation herein.

The co-located image block is an image block centered on the co-located pixel point f(x0, y0, (t+1)) in the next image frame f(t+1), and is denoted as Block1 (t+1). The corresponding co-located image block Block1 (t+1) has the same size as the corresponding first image block Block1 (t).

Step S203, searching for image blocks similar to the first image block in the previous image frame and the next image frame of the image frame to be detected, and searching for image blocks similar to the co-located image block in the image frame to be detected as the first similar image block, second similar image block and third similar image block, respectively.

In the specific implementation, the existing search algorithms, such as global algorithm, three-step search algorithm or diamond search algorithm, can be used to search for image blocks similar to the first image block Block1 (t) in the previous image frame f(t−1) and the next image frame f(t+1), respectively, and to search for image blocks similar to the co-located image block Block1 (t+1) in the image frame f(t) to be detected, and the first similar image block, second similar image block and third similar image block obtained by the search the denoted as SB1 (t−1), SB2 (t+1) and SB3 (t), respectively.

In an embodiment of the present invention, the corresponding similar image block is determined by calculating the Sum of Absolute Differences (SAD). Specifically, the first similar image block SB1 (t−1) is the image block with the smallest SAD between the previous image frame f(t−1) and the first image block Block1 (t), the second similar image block SB2 (t+1) is the image block with the smallest SAD between the next image frame f(t+1) and the first image block Block1 (t), the third similar image block SB3 (t) is the image block with the smallest SAD between the image frame f(t) to be detected and the co-located image block Block1 (t+1).

In an embodiment of the present invention, the sum of absolute differences between the corresponding image blocks is calculated using the following formula:

$$D(i, j) = \sum_{M=0}^{W} \sum_{N=0}^{H} |S(i+M, j+N) - T(M, N)| \quad (1)$$

where, D(i,j) denotes the sum of absolute differences between the corresponding image blocks, (i,j) is the position of the start point in the upper left corner of the corresponding image block, S(i+M,j+N) denotes the corresponding image block, T(M,N) denotes corresponding matching template, W denotes the width of the corresponding image block, and H denotes the height of the corresponding image block.

When the value of D(i,j) calculated by the formula (1) above is the smallest, the M*N pixel block starting from this position (i,j) is considered to be the best match with the matching template T(M,N), and the image block corresponding to D(i,j) is used as the corresponding similar image block.

It will be understood that other ways of determining the first similar image block SB1 (t−1), second similar image block SB2 (t+1) and third similar image block SB3 (t) may also be used, and the person skilled in the art may choose according to the practical needs without limitation here.

Step S204, calculating respectively a first motion vector of the first image block pointing to the first similar image block and a second motion vector of the first image block pointing to the second similar image block, and calculating a third motion vector of the co-located image block pointing to the third similar image block.

The first motion vector, second motion vector and third motion vector are denoted as vec1 (x0, y0), vec2 (x0, y0) and vec3 (x0, y0), respectively. Wherein, the first motion vector vec1 (x0, y0) is used to indicate the information of the motion direction between the first similar image block SB1 (t−1) and the first image block Block1 (t); the second motion vector vec2 (x0, y0) is used to indicate the information of the motion direction between the first image block Block1 (t) and the second similar image block SB2 (t+1); the third motion vector vec3 (x0, y0) is used to indicate information of the motion direction between the co-located image block Block1 (t+1) and the third similar image block SB3 (t).

In the specific implementation, the calculation mode of the first motion vector vec1 (x0, y0), the second motion vector vec2 (x0, y0) and the third motion vector vec3 (x0, y0) may be performed by using the existing algorithm for the calculation of the motion vectors between the image blocks, without any limitation here.

Step S205, determining the reliability or not of the similarity calculation of the first similar image block, second similar image block and third similar image block, or the reliability or not of the motion vector calculation of the first motion vector, second motion vector and third motion vector, or the consistency or not of the direction between the first motion vector and second motion vector and third motion vector; when the judgment result is yes, step S206 can be performed, otherwise, step S207 can be performed.

In a specific implementation, when the first similar image block SB1 (t−1), the second similar image block SB2 (t+1) and the third similar image block SB3 (t) are calculated to having a minimum sum of absolute errors (SAD), it is determined whether the similarity calculation of the first similar image block SB1 (t−1), the second similar image block SB2 (t+1) and the third similar image block SB3 (t) is reliable, i.e., it is determined whether the sum of absolute differences calculation corresponding to the first similar image block SB1 (t−1), the second similar image block SB2 (t+1) and the third similar image block SB3 (t) is reliable.

In an embodiment of the present invention, a method for determining whether the sum of absolute differences calculation corresponding to the first similar image block SB1 (t−1), second similar image block SB2 (t+1) and third similar image block SB3 (t) is reliable, comprising:

the sum of absolute differences SAD1 between the first similar image block SB1 (t−1) and the first image block Block1 (t), the sum of absolute differences SAD2 between the second similar image block SB2 (t+1) and the first image block Block1 (t) and the sum of absolute differences SAD3 between the third similar image block SB3 (t) and the co-located image block Block1 (t+1) are obtained.

The sum of absolute differences SAD1 between the first similar image block SB1 (t−1) and the first image block Block1 (t) is compared with a predetermined first sum of absolute differences threshold value sad_th1; when it is determined that the sum of absolute differences SAD1 between the first similar image block SB1 (t−1) and the first image block Block1 (t) is less than the first sum of absolute differences threshold value sad_th1, then it is determined that the sum of absolute differences calculation of the first similar image block SB1 (t−1) is reliable; otherwise, then it is determined that the sum of absolute differences calculation of the first similar image block SB1 (t−1) is not reliable.

The sum of absolute differences SAD2 between the second similar images block SB2 (t+1) and the first image block Block1 (t) is compared with the second sum of absolute differences threshold sad_th2, and when it is determined that the sum of absolute differences SAD2 between the second similar images block SB2 (t+1) and the first image block Block1 (t) is less than the second sum of absolute differences threshold sad_th2, then it is determined that the sum of absolute differences calculation of the second similar images block SB2 (t+1) is reliable; otherwise, it is determined that the sum of absolute differences calculation of the second similar images block SB2 (t+1) is not reliable.

The sum of absolute differences SAD3 between the third similar image block SB3 (t) and the co-located image block Block1 (t+1) are compared with the third sum of absolute differences threshold value sad_th3, and when it is determined that the sum of absolute differences SAD3 between the third similar image block SB3 (t) and the co-located image block Block1 (t+1) is less than the third sum of absolute differences threshold value sad_th3, then it is determined that the sum of absolute differences calculation of the third similar image block SB3 (t) is reliable; otherwise, it is determined that the sum of absolute differences calculation of the third similar image block SB3 (t) is not reliable.

In the specific implementation, the first sum of absolute differences threshold sad_th1, the second sum of absolute differences threshold sad_th2 and the third sum of absolute differences threshold sad_th3 could be set to be the same or different according to the actual needs, without any limitation here.

It is understood that when the sum of absolute differences calculation corresponding to the first similar image block SB1 (t−1), second similar image block SB2 (t+1) and third similar image block SB3 (t) all have reliability, it indicates that the similarity of the current pixel point on the front and rear frames of the video image is relatively large, while the similarity of the pixel points within the static identification area on the front and rea frames of the video image is relatively small. Therefore, when the sum of absolute differences calculation of the first similar image block SB1 (t−1), the second similar image block SB2 (t+1) and the third similar image block SB3 (t) is reliable, it indicates that the current pixel point has the possibility of being a pixel point within a non-static identification area.

In an embodiment of the present invention, a method for determining whether the motion vector calculation of the first motion vector vec1 (x0, y0), the second motion vector vec2 (x0, y0), and the third motion vector vec3 (x0, y0) is reliable, comprising:

the horizontal component vec1 (x0) of the first motion vector vec1 (x0, y0) is compared with a first horizontal component threshold vecx th1, and the vertical component vec1 (y0) of the first motion vector vec1 (x0, y0) is compared with a first vertical component threshold vecy th1; when the horizontal component vec1 (x0) of the first motion vector vec1 (x0, y0) is greater than the first horizontal component threshold vecx th1, and live vertical component vec1 (y0) of the first motion vector vec1 (x0, y0) is greater than the first vertical component threshold vecy th1, it is determined that the calculation of the corresponding first motion vector vec1 (x0, y0) is reliable; otherwise, the calculation of the corresponding first motion vector vec1 (x0, y0) is not reliable:

the horizontal component vec2 (x0) of the second motion vector vec2 (x0, y0) is compared with a second horizontal component threshold vecx th2 and the v vertical component vec2 (y0) of the second motion vector vec2 (x0, y0) is compared with a second vertical component threshold vecy th2; when the horizontal component vec2 (x0) of the second motion vector vec2 (x0, y0) is greater than the second horizontal component threshold vecx th2, and the vertical component vec2 (y0) of the second motion vector vec2 (x0, y0) is greater than the second vertical component threshold vecy th2, the calculation of the corresponding second motion vector vec2 (x0, y0) is reliable; otherwise, the calculation of the corresponding second motion vector vec2 (x0, y0) is not reliable;

the horizontal component vec3 (x0) of the third motion vector vec3 (x0, y0) is compared with a third horizontal component threshold vecx th3, and the vertical component vec3 (y0) of the third motion vector vec3 (x0, y0) is compared with a third vertical component threshold vecy th3; when the horizontal component vec3 (x0) of live third motion vector vec3 (x0, y0) is greater than the third horizontal component threshold vecx th3, and the vertical component vec3 (y0) of the third motion vector vec3 (x0, y0) is greater than the third vertical component threshold vecy th3, then the calculation of the corresponding third motion vector vec3 (x0, y0) is reliable; otherwise, the calculation of the corresponding third motion vector vec3 (x0, y0) is not reliable.

In the specific implementation, the first horizontal component threshold vecx th1, the second horizontal component threshold vecx th2 and the third horizontal component threshold vecx th3 could be set to the same or different according to the actual needs; the first vertical component threshold vecy th1, the second vertical component threshold vecy th2 and the third vertical component threshold vecy th3 could be set to the same or different according to the actual needs, without limitation here.

It can be understood that when the motion vector calculation of the first motion vector vec1 (x0, y0), the second motion vector vec2 (x0, y0) and the third motion vector vec3 (x0, y0) are reliability, it indicates that the motion vector of the current pixel point f(x0, y0, t) in the direction of the front and rear frames of the video is larger, while the pixel points in the static identification area are static objects with a motion vector about zero. Therefore, when the motion vector calculation of the first motion vector vec1 (x0, y0), the second motion vector vec2 (x0, y0) and the third motion vector vec3 (x0, y0) is reliable, it indicates that the pixel point has the possibility of being a pixel point within a non-static identification area.

In an embodiment of the present invention, a method for determining w whether there is consistency in direction between the first motion vector vec1 (x0, y0) and the second motion vector vec2 (x0, y0) and the third motion vector vec2 (x0, y0), comprising:

the absolute sum of the difference |vec1 (x0)-vec2 (x0)| between the horizontal component vec1 (x0) of the first motion vector vec1 (x0, y0) and the horizontal component vec2 (x0) of the second motion vector vec2 (x0, y0) is calculated and the absolute sum of the difference |vec1(y0)−vec2(y0)| between the vertical component vec1 (y0) of the first motion vector vec1 (x0, y0) and the vertical component vec2(y0) of the second motion vector vec2(x0, y0), and the sum of | vec1(x0)−vec2(x0)| and |vec1(y0)−vec2(y0)| is calculated as a first absolute difference sum dif_1;

the absolute sum of the difference |vec1 (x0)−vec3 (x0)| between the horizontal component vec1 (x0) of the first motion vector vec1 (x0, y0) and the horizontal component vec3 (x0) of the third motion vector vec3 (x0, y0) is calculated and the absolute sum of the difference |vec1(y0)−vec3(y0)| between the vertical component vec1 (y0) of the first motion vector vec1 (x0, y0) and the vertical component vec3(y0) of the vector vec1(x0, y0) is calculated, and the sum of |vec1(x0)−vec3(x0)| and |vec1(y0)−vec3(y0)| is calculated as a second absolute difference sum dif_2;

When it is determined that the sum of the first absolute difference sum dif_1 and the second absolute difference sum dif_2 is less than a absolute difference sum threshold dif_th, it is determined that the direction between the first motion vector vec1 (x0, y0) and the second motion vector vec2 (x0, y0) and the third motion vector vec3 (x0, y0) is consistent.

In the specific implementation, the absolute difference sum threshold dif_th could be set according to the actual needs and are not limited here.

It can be understood that when the direction of the first motion vector vec1 (x0, y0) is consistent with the second motion vector vec2 (x0, y0) and the third motion vector vec3 (x0, y0), it indicates that the motion vector of the current pixel point is consistent in the direction of the front and rear frames of the video image, while the motion vectors of the pixel points in the static identification area have a poor consistency. Therefore, when the motion vector calculation of the first motion vector vec1 (x0, y0), the second motion vector vec2 (x0, y0), and the third motion vector vec3 (x0, y0) is reliable, it indicates that the current pixel point has the possibility of being a pixel point within a non-static identification area.

Step S206, determining the current pixel point traversed to as a pixel point within the non-static identification area.

In a specific implementation, when it is determined that the similarity calculation of the first similar image block SB1 (t−1), second similar image block SB2 (t+1) and third similar image block SB3 (t) is reliable, or that the motion vector calculation of the first motion vector vec1 (x0, y0), the second motion vector vec2 (x0, y0) and the third motion vector vec3 (x0, y0) is reliable, or that the direction between the first motion vector vec1 (x0, y0) and the second motion vector vec2 (x0, y0) and the third motion vector vec3 (x0, y0) is consistency, the current pixel point f(x0, y0, t) traversed to could be identified as a pixel point in the non-static identification area.

Step S207 is performed to determine the current pixel point traversed to as a pixel point within the static identification area.

In a specific implementation, when it is determined that the similarity calculation of the first similar image block SB1 (t−1), second similar image block SB2 (t+1) and third similar image block SB3 (t) is not reliable, and the motion vector calculation of the first motion vector vec1 (x0, y0), the second motion vector vec2 (x0, y0) and the third motion vector vec3 (x0, y0) is not reliable, and the direction between the first motion vector vec1 (x0, y0) and the second motion vector vec2 (x0, y0) and the third motion vector vec3 (x0, y0) is not consistent, the current pixel point f(x0, y0, t) traversed to is identified as a pixel point m the non-static identification area.

Figure 3:
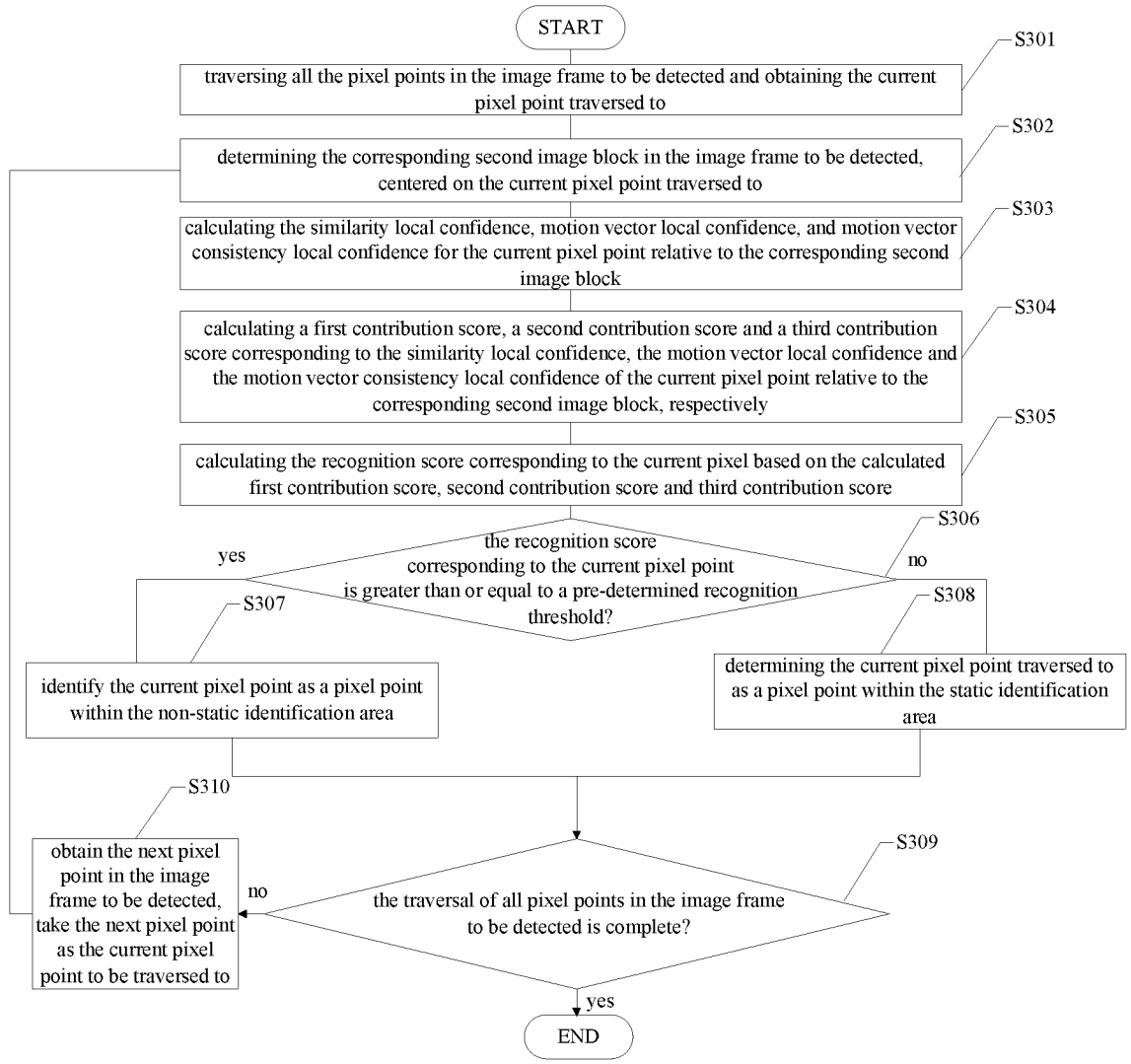
FIG. 3 shows a flow diagram of yet another static identification area detecting method in an embodiment of the present invention.

Step S208 is performed to determine whether the traversal of all pixel points in the image frame to be detected is completed, when the judgment result is yes, the subsequent steps in FIG. 3 can be performed; otherwise, step S209 can be performed.

Step S209 is performed to acquire the next pixel point in the image frame to be detected, and the acquired next pixel point is used as the current pixel point to be traversed, and is performed from step S202 until all the pixel points in the image frame to be detected are traversed.

By performing the above steps S201 to S209, it is possible to determine whether a pixel point is a pixel point in the static identification area by the characteristics of each pixel point in the image frame to be detected in terms of similarity, motion vector and motion vector direction consistency on the front and rear frames of the video. In another embodiment of the present invention, in order to further improve the accuracy of detection, the corresponding similarity local confidence identification could be set for the corresponding pixel point based on the reliability or not of the similarity calculation of the corresponding first similar image block, second similar image block and third similar image block; the corresponding motion vector local confidence identification could be set for the corresponding pixel point based on the reliability or not of the motion vector calculation of the corresponding first motion vector, second motion vector and third motion vector; the corresponding motion vector consistency local confidence identification could be set for the corresponding pixel point based on the consistency or not of the direction between the first motion vector and the second motion vector and the third motion vector. Specifically:

When the similarity calculation of the corresponding first similar image block SB1 (t−1) second similar image block SB2 (t+1) find third similar image block SB3 (t) is reliable, the similarity load confidence identification sad_flag_mux (x,y,t) of the corresponding pixel points (x,y,t) is set to a first value; conversely, when the similarity calculation of the corresponding first similar image block SB1 (t−1), the second similar image block SB2 (t+1) and the third similar image block SB3 (t) is not with reliability, the similarity local confidence identification sad_flag_mux (x,y,t) of the corresponding pixel point (x,y,t) is set to a second value.

When the motion vector computation of the corresponding first motion vector vec1 (x0, y0), second motion vector vec2 (x0, y0) and third motion vector vec3 (x0, y0) is reliable, the local confidence identification vec_flag_mux (x,y,t) of the corresponding pixel point (x,y,t) is set to a third value; conversely, when the motion vector computation of the corresponding first motion vector vec1 (x0, y0), second motion vector vec2 (x0, y0) and third motion vector vec3 (x0, y0) is not reliable, the corresponding similarity local confidence identification is set to a fourth value.

When the direction among the corresponding first motion vector vec1 (x0, y0) and the second motion vector vec2 (x0, y0) and the third motion vector vec3 (x0, y0) is consistent, the motion vector consistency local confidence identification vec_flag_mux (x,y,t) of the corresponding pixel point (x,y,t) is set to a fifth value; conversely, when the direction among corresponding first motion vector vec1 (x0, y0) and the second motion vector vec2 (x0, y0) and the third motion vector vec3 (x0, y0) is not consistent, the corresponding motion vector consistency local confidence identification is set to a sixth value.

In a specific implementation, the first value, second value, third value, fourth value, fifth value and sixth value could be set according to the actual needs, as long as the first and second values set are different, the third and fourth values set are different, and the fifth and sixth values set are different. In an embodiment of the present invention, the first value, third value and fifth value are the same and all are 1; the second value, fourth value and sixth value are the same and all are 0.

After setting the corresponding similarity local confidence identification, motion vector local confidence identification, and motion vector consistency local confidence identification for each pixel point in the image frame to be detected in the above way, the consistency of the pixel point with other surrounding pixel points in the time and spatial domains is compared using the corresponding similarity local confidence identification, motion vector local confidence identification, and motion vector consistency local confidence identification, to further determine whether the pixel point is a pixel point in the statically identified area, for details, please refer to FIG. 3.

Step S301 is performed to traverse all the pixel points in the image frame to be detected and obtain the current pixel point traversed to.

Step S302 is performed to determine the corresponding second image block in the image frame to be detected, centered on the current pixel point traversed to.

The second image block includes the current pixel point to be detected in the image frame to be detected, and other pixel points located within the domain of the current pixel point to be detected, denoted as Block2 (t).

In a specific implementation, the size of the second image block Block2 (t) is a*b. It is understood by a person skilled in the art that the size of the second image block Block2 (t) may be set to a*b according to practical needs, where a is the number of pixels in each row of the second image block Block2 (t) and b is the number of pixels in each column of the second image block Block2 (t), and both a and b are integers greater than or equal to 2.

In the specific implementation, the second image block Block2 (t) can be the same or different from the first image block Block1 (t), that is, the value of a can be the same or different from the value of M, and the value of b can be the same or different from the value of N. A person skilled in the art can set them according to the actual needs and will not be limited here.

step S303 is performed to calculate the similarity local confidence, motion vector local confidence, and motion vector consistency local confidence for the current pixel point relative to the corresponding second image block.

In an embodiment of the present invention, a method for calculating the similarity local confidence doc1 of the current pixel point f(x0, y0, t) relative to the corresponding second image block Block2 (t), includes:

First, the similarity local confidence identification sad_flag_mux (x,y) of each pixel point f(x,y,t) in the second image block Block2 (t) corresponding to the current pixel point f(x0, y0, t) is obtained. Wherein, the method of calculating the similarity local confidence identification sad_flag_mux (x,y) of each pixel point f(x,y,t) within the second image block Block2 (t) is described in the previous corresponding section and will not be repeated.

Figure 4:
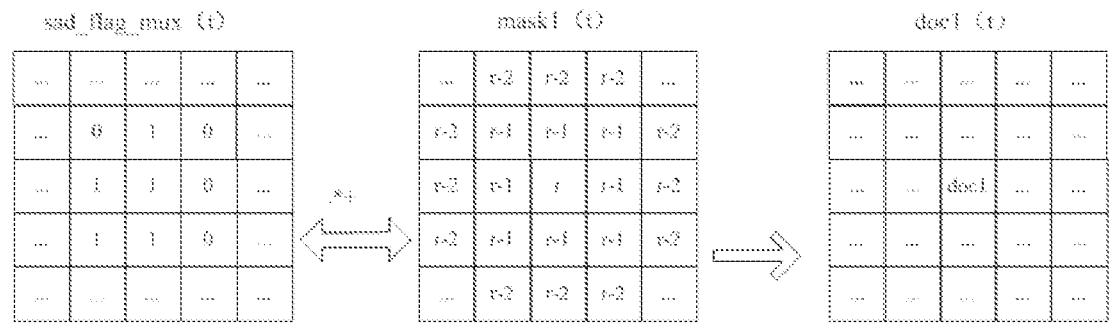
FIG. 4 shows a schematic diagram of calculating the similarity local execution of the current pixel point relative to the first image block in an embodiment of the present invention.

Please Refer to FIG. 4, when the similarity local confidence identification sad_flag_mux (x,y) of each pixel point f(x,y,t) in the corresponding second image block Block2 (t) is obtained, the similarity local confidence identification sad_flag_mux (x,y,t) of each pixel point f(x,y,t) is placed at the corresponding pixel point position (x,y), and a corresponding first identification matrix sad_flag_mux (t) could be obtained.

After that, by performing the summation operation after the dot product operation of the first identification matrix sad_flag_mux (t) and a pre-determined first identification template mask1 (t), a similarity local confidence doc1 of the current pixel point f(x0, y0, t) relative to the second image block Block2 (t) is obtained wherein the first identification template mask1 (t) and the first identification matrix sad_flag_mux (t) are matrices of the same size, i.e., both are matrices of size a*b, and each element within the first identification template mask1 (t) is a non-negative integer.

The method for calculating the motion vector local confidence and the motion vector consistency local confidence of the current pixel point f(x0, y0, t) relative to the corresponding second image block Block2 (t) is similar to the method described above for calculating the motion vector local confidence of the current pixel point f(x0, y0, t) relative to the second image block Block2 (t). Specifically:

In an embodiment of the present invention, the method for calculating the motion vector local confidence doc2 of the current pixel point f(x0, y0, t) relative to the corresponding second image block Block2 (t) includes:

The motion vector local confidence flag vec_flag_mux (x,y,t) corresponding to each pixel point f(x,y,t) within the corresponding second image block Block2 (t) is obtained. Wherein, the calculation of the motion vector local confidence identification vec_flag_mux (x,y,t) of each pixel point f(x,y,t) within the second image block Block2 (t) is described in the previous corresponding section and will not be repeated.

When the motion vector local confidence identification vec_flag_mux (x,y,t) corresponding to each pixel point f(x,y,t) in the corresponding second image block Block2 (t) is obtained, the motion vector local confidence identification vec_flag_mux (x,y,t) corresponding to each pixel point f(x,y,t) in the corresponding second image block Block2 (t) (x,y,t) is placed at the corresponding pixel location (x,y) to obtain a corresponding second identification matrix vec_flag_mux (t).

Finally, by performing the summation operation after the dot product operation of the second identification matrix vec_flag_mux (t) and the second identification template mask2 (t) a motion vector local confidence doc2 of the current pixel f(x0, y0, t) relative to the second image block Block2 (t) is obtained, wherein, the second identification template mask2 (t) and the second identification matrix vec_flag_mux (t) are matrices of die same size, i.e., both are matrices of size a*b, and each element within the second identification template mask2 (t) is a non-negative integer.

In an embodiment of the present invention, the method for calculating the motion vector consistency local confidence level doc3 of the current pixel point f(x0, y0, t) relative to the second image block Block2 (t) includes:

First, the motion vector consistency local confidence identification dif_flag_mux (x,y,t) corresponding to each pixel point f(x,y,t) within the corresponding second image block Block2 (t) is obtained. Wherein, the calculation of the motion vector consistency local confidence identification dif_flag_mux (x,y,t) of each pixel point f(x,y,t) within the second image block Block2 (t) is described m the previous corresponding section and will not be repeated.

After that, the motion vector consistency local confidence identification dif_flag_mux (x,y,t) corresponding to each pixel point f(x,y,t) in the acquired second image block Block1 (t) is placed at the corresponding pixel point position (x,y), and the corresponding third identification matrix dif_flag_mux (t) is obtained.

Finally, by performing the summation operation after the dot product of the third identification matrix dif_flag_mux (t) and a third identification template mask3 (t), a motion vector consistency local confidence doc3 of the pixel f(x0, y0, t) relative to live second image block Block2 (t) is obtained, wherein the third identification template mask3 (t) and the third identification matrix dif_flag_mux (t) are matrices of the same size, i.e., both are matrices of size a*b, and each element within the third identification template mask3 (t) is a non-negative integer.

Step S304, a first contribution score, a second contribution score and a third contribution score corresponding to the similarity local confidence, the motion vector local confidence and the motion vector consistency local confidence of the current pixel point relative to the corresponding second image block are calculated, respectively.

In an embodiment of the present invention, the first contribution score score1, the second contribution score2 and the third contribution score3 corresponding to the similarity local confidence doc1, the motion vector local confidence doc2 and the motion vector consistency local confidence doc3 of the current pixel point f(x0, y0, t) could be calculated in the following manner:

(a) When calculating the first contribution score score1 corresponding to the similarity local confidence doc1, the similarity local confidence doc1 of the current pixel point f(x0, y0, t) is compared with the pre-determined first similarity local confidence threshold sad_flag_th1 and the second similarity local confidence threshold sad_flag_th2, respectively; when the similarity local confidence doc1 of the current pixel point f(x0, y0, t) is less than the first similarity local confidence threshold sad_flag_th1, the corresponding first contribution score score1 is set to a seventh value; when the similarity local confidence doc1 of the current pixel point f(x0, y0, t) is greater than or equal to the first similarity local confidence threshold sad_flag_th1 and less than the second similarity local confidence threshold sad_flag_th2, the corresponding first contribution score score1 is set to an eighth value, when the similarity local confidence doc1 of the current pixel f(x0, y0, t) is greater than or equal to the second similarity local confidence threshold sad_flag_th2, the corresponding first contribution score score1 is set to a ninth value.

The first similarity local confidence threshold sad_flag_th1 and the second similarity local confidence threshold sad_flag_th2 could be set according to the actual needs, as long as the set first similarity local confidence threshold sad_flag_th1 is less than the second similarity local confidence threshold sad_flag_th2.

(b) When calculating the second contribution score2 corresponding to the motion vector local confidence doc2 of the current pixel point f(x0, y0, t), the motion vector local confidence doc2 of the current pixel point f(x0, y0, t) is compared with the pre-determined first motion vector local confidence threshold vec_flag_th1 and the second motion vector local confidence threshold vec_flag_th2; when the motion vector local confidence doc2 of the current pixel f(x0, y0, t) is less than the first motion vector local confidence threshold vec_flag_th1, the corresponding second contribution score2 is set to a tenth value; when the motion vector local confidence doc2 of the current pixel f(x0, y0, t) is greater than or equal to the first motion vector local confidence threshold vec_flag_th1 and less than the second motion vector local confidence threshold vec_flag_th2, the corresponding second contribution score2 is set to an eleventh value; when the corresponding motion vector local confidence doc2 is greater than or equal to the second motion vector local confidence threshold sec_flag_th2, the corresponding second contribution score2 is set to a twelfth value.

Where the first motion vector local confidence threshold vec_flag_th1 and the second motion vector local confidence threshold vec_flag_th2 could beset according to the actual needs, as long as the set first motion vector local confidence threshold vec_flag_th1 is less than the second motion vector local confidence threshold vec_flag_th2.

(c) When calculating the third contribution score score3 corresponding to the motion vector consistency local confidence doc3 of the current pixel point f(x0, y0, t), the motion vector consistency local confidence doc3 of the current pixel point f(x0, y0, t) is compared with the pro-determined first motion vector consistency local confidence threshold dif_flag_th1 and the second motion vector consistency local confidence threshold dif_flag_th2; when the motion vector consistency local confidence doc3 of the current pixel f(x0, y0, t) is less than the first motion vector consistency local confidence threshold dif_flag_th1, the corresponding third contribution score3 is set to a thirteenth value; when the motion vector consistency local confidence doc3 of the current pixel f(x0, y0, t) is greater than or equal to the first motion vector consistency local confidence threshold dif_flag_th1 and less than the second motion vector consistency local confidence threshold dif_flag_th2, the corresponding third contribution score3 is set to a fourteenth value; when the motion vector consistency local confidence doc3 is greater than or equal to the second motion vector consistency local confidence threshold dif_flag_th2, the corresponding third contribution score3 is set to a fifteenth value.

where the first motion vector consistency local confidence threshold dif_flag_th1 and the second motion vector consistency local confidence threshold dif_flag_th2 could be set according to actual needs, as long as the set first motion vector consistency local confidence threshold dif_flag_th1 is less than the second motion vector consistency local confidence threshold dif_flag_th2.

It is understood that the seventh to fifteenth values could be set according to the actual needs, as long as the set seventh, eighth and ninth values are different, the tenth, eleventh and twelfth values are different, and the thirteenth, fourteenth and fifteenth values are different, without limitation here.

In an embodiment of the present invention, the seventh value, tenth value and thirteenth value are 0, the eighth value, eleventh value and fourteenth value are 1, and the ninth value, twelfth value and fifteenth value are 2.

Step S305 is performed to calculate the recognition score corresponding to the current pixel based on the calculated first contribution score, second contribution score and third contribution score.

In an embodiment of the present invention, when the first contribution score score1, the second contribution score2 and the third contribution score3 corresponding to the current pixel point are calculated, the recognition score Score corresponding to the pixel point is calculated using the following formula:

$$\text{Score}=(\text{score1}*a)+(\text{score2}*a2)+(\text{score3}*a3) \quad (2)$$

and:

$$a1+a2+a3=1 \quad (3)$$

Where, a1, a2 and a3 denote the weights corresponding to the first, second and third contribution scores, respectively.

Step S306 is performed to determine whether the recognition score corresponding to the current pixel point is greater than or equal to a pre-determined recognition threshold, when the judgment result is yes, step S307 can be performed; conversely, step S308 can be performed.

In a specific implementation, the recognition threshold score_th may be set according to the needs of the static identification area identification, without limitation herein.

Step S307 is performed to identify the current pixel point as a pixel point within the non-static identification area.

In a specific implementation, when it is determined that the recognition score Score corresponding to the current pixel point f(x0, y0, t) is greater than or equal to the pre-determined recognition threshold score_th, it indicates that the current pixel point f(x0, y0, t) is consistent with the other pixel points f(x,y,t) within the second image block Block2 (t) in the time and spatial domains, and conforms to the characteristics of the pixels within the non-static identification area. Therefore, the current pixel point f(x0, y0, t) in the image frame to be detected could be determined as a pixel point in the non-static identification area. At this point, the identification logo_flag corresponding to the current pixel f(x0, y0, t) could be set to a corresponding value, such as 1, so that the value of the identification logo_flag can be used to determine the current pixel f(x0, y0, t) as a pixel point in the non-static identification area in the future.

Step S308 is performed to identify the current pixel point as a pixel point within the static identification area.

In the specific implementation, when it is determined that the recognition score Score corresponding to the current pixel point f(x0, y0, t) is less than the pre-determined recognition threshold score_th, it indicates that the current pixel point f(x0, y0, t) is not consistent with the other pixel points f(x,y,t) within the second image block Block2 (t) in both the time domain and the spatial domain, and conforms to the characteristics of the pixel points within the static identification area. Therefore, the current pixel point f(x0, y0, t) in the image frame to be detected could be determined as a pixel point in the static identification area. At this point, the identification logo_flag corresponding to the current pixel f(x0, y0, t) could be set to a corresponding value, such as 0, so that the value of the identification logo_flag could be used to determine the current pixel f(x0, y0, t) as a pixel point in the static identification area in the future.

Step S309 is performed to determine whether the traversal of all pixel points in the image frame to be detected is complete, when the judgment result is yes, the operation is ended; when the judgment result is no, step S319 may be performed.

Step S310 is performed to obtain the next pixel point in the image frame to be detected, take the next pixel point as the current pixel point to be traversed to, and execution from step S302 is restarted until all the pixel points in the image frame to be detected are traversed.

The static identification area detecting method in the embodiment of the present invention has been described in detail above, and the modules corresponding to the static identification area detecting method will be described below.

Figure 5:
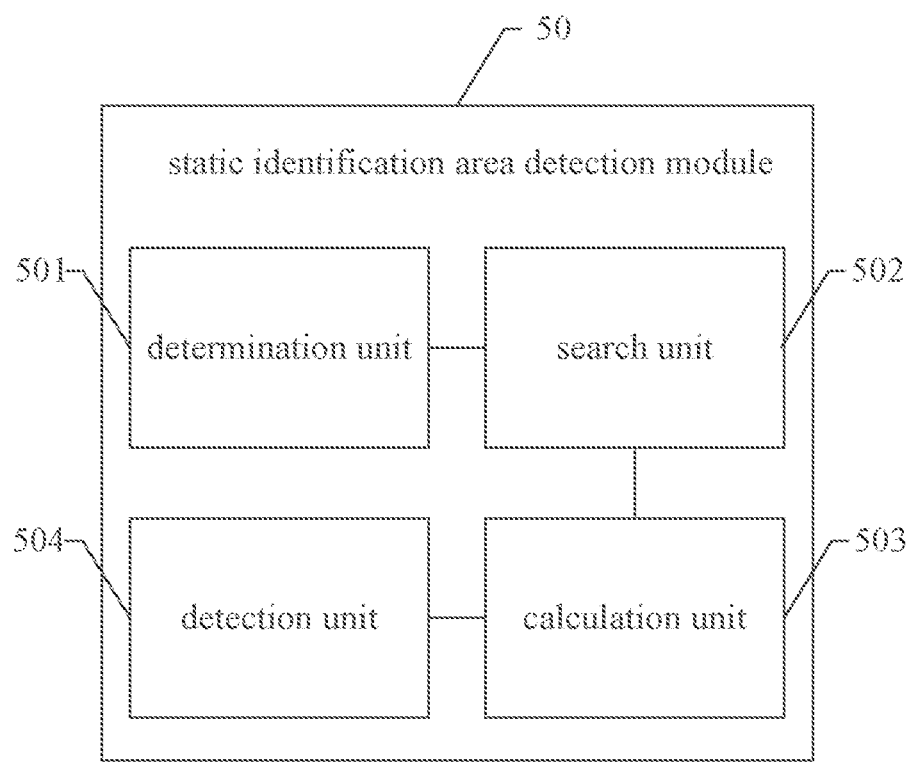
FIG. 5 shows a schematic frame structure diagram of a static identification area detection module in an embodiment of the present invention.

FIG. 5 illustrates a schematic frame structure diagram of a static identification area detection module in an embodiment of the present invention. Referring to FIG. 5, a static identification area detection module 50, may include a determination unit 501, a search unit 502, a calculation unit 503, and a detection unit 504, wherein:

the determination unit 501, adapted to determine the corresponding first image block in the image frame to be detected, centered on each pixel point in the image frame to be detected, and to determine the corresponding co-located image block in the next image frame of the image frame to be detected, centered on the collocated pixel point in the next image frame of the image frame to be detected; the coordinate position of the co-located pixel point is the same as the coordinate position of the pixel point in the image frame to be detected;

the search unit 502, adapted to search for image blocks similar to the corresponding first image block in the previous image frame and the next image frame of the image frame to be detected, and to search for image blocks similar to the corresponding co-located image blocks in the image frame to be detected as the corresponding first similar image block, second similar image block and third similar image block, respectively;

the calculation unit 503, adapted to calculate respectively a first motion vector of the corresponding first image block pointing to the corresponding first similar image block and a second motion vector of the corresponding first image block pointing to the corresponding second similar image block, and to calculate a third motion vector of the corresponding co-located image block pointing to the corresponding third similar image block;

the detection unit 504, adapted to determine whether the corresponding pixel point in the image frame to be detected is a pixel within the static identification area based on the corresponding first similar image block, second similar image block and third similar image block and the corresponding first motion vector second motion vector and third motion vector.

the search unit 502, in an embodiment of the present invention, adapted to search for an image block having a minimum sum of absolute differences with the corresponding first image block in the previous image frame and the next image frame of the image frame to be detected, respectively, and to search for an image block having a minimum sum of absolute differences with the corresponding co-located image block in the image frame to be detected as the first similar image block, the second similar image block and the third similar image block.

In an embodiment of the present invention, the detection unit 504, adapted to determine the reliability or not of the similarity calculation of the corresponding first similar image block, second similar image block and third similar image block, or the reliability or not of the motion vector calculation of the corresponding first motion vector, second motion vector and third motion vector, or the consistency or not of the direction of the corresponding first motion vector, second motion vector and third motion vector; to determine that the corresponding pixel point is a pixel point in the non-static identification area when the reliability of the similarity calculation of the corresponding first similar image block, second similar image block and third similar image block confirmed, or the reliability of the motion vector calculation of the corresponding first motion vector, second motion vector and third motion vector confirmed, or the consistency of the direction of the corresponding first motion vector, second motion vector and third motion vector confirmed, otherwise, to determine that the corresponding pixel point is a pixel point in the static identification area.

In an embodiment of the present invention, the detection unit 504, adapted to determine that the similarity calculation of the corresponding first similar image block is reliable when the sum of absolute differences between the corresponding first similar image block and the corresponding first image block is less than a first sum of absolute differences threshold; otherwise, to determine that the similarity calculation of the corresponding first similar image block is not reliable; to determine that the similarity calculation of the corresponding second similar image block is reliable when the sum of absolute differences between the corresponding second similar image block and the corresponding first image block is less than a second sum of absolute differences threshold; otherwise, to determine that the similarity calculation of the corresponding second similar image block is not reliable; to determine that the similarity calculation of the corresponding third similar image block is reliable when the sum of absolute differences between the corresponding third similar image block and the corresponding co-located image block is less than the third sum of absolute differences threshold; otherwise, to determine that the similarity calculation of the corresponding third similar image block is not reliable.

In an embodiment of the present invention, the detection unit 504, adapted to determine that the calculation of the corresponding first motion vector is reliable when the horizontal component of the corresponding first motion vector is greater than a first horizontal component threshold and the vertical component of the corresponding first motion vector is greater than a first vertical component threshold; otherwise, to determine that the calculation of the corresponding first motion vector is not reliable; to determine that the calculation of the corresponding second motion vector is reliable when the horizontal component of the corresponding second motion vector is greater than a second horizontal component threshold and the vertical component of the corresponding second motion vector is greater than a second vertical component threshold, otherwise, to determine that the calculation of the corresponding second motion vector is not reliable; to determine that the calculation of the corresponding third motion vector is reliable when the horizontal component of the corresponding third motion vector is greater than the third horizontal component threshold and the vertical component of the corresponding third motion vector is greater than a third horizontal component threshold and the vertical component of the corresponding third motion vector is greater than a third vertical component threshold; otherwise, to determine that the calculation of the corresponding third motion vector is not reliable.

In an embodiment of the present invention, the detection unit 504, adapted to calculate the sum of the absolute sum of the difference between the horizontal component of the corresponding first motion vector and the corresponding second motion vector and the absolute sum of the difference between the vertical component of the corresponding first motion vector and the corresponding second motion vector as a first absolute difference sum; to calculate the sum of the absolute sum of the difference between the horizontal component of the corresponding first motion vector and the corresponding third motion vector and the absolute sum of the difference between the vertical component of the corresponding first motion vector and the corresponding third motion vector as the second absolute difference sum, to determined that the direction of the corresponding first motion vector is consistent with the second motion vector and the third motion vector when determined that the sum of the first absolute difference sum and the second absolute difference sum is less than the absolute difference sum threshold, conversely, to determine that the direction of the corresponding first motion vector is not consistent with the direction of the corresponding second motion vector and the corresponding third motion vector.

In an embodiment of the present invention, the detection unit 504, further adapted to set a corresponding local confidence identification for the pixel point in the image frame to be detected based on the information on the reliability of the similarity calculation of the corresponding first similar image block, second similar image block and third similar image block and the reliability of the motion vector calculation of the corresponding first motion vector, second motion vector and third motion vector, and the information on the direction consistency of the motion vector of the corresponding first motion vector, second motion vector and third motion vector, after determine whether the similarity calculation of the corresponding first similar image block, second similar image block and third similar image block is reliable, whether the motion vector calculation of the corresponding first motion vector, second motion vector and third motion vector is reliable, and whether the direction of the corresponding first motion vector, second motion vector and third motion vector is consistent; to determine a corresponding second image block in the image frame to be detected centered on each pixel point in the image frame to be detected; to calculate the local confidence information of the corresponding pixel point relative to the corresponding second image block based on the local confidence identification of all pixel points within the corresponding second image block; the local confidence information is used to identify information on the consistency of the corresponding pixel point with other pixel points within the corresponding second image in the time and spatial domains; to determine, based on the calculated local confidence information of the corresponding pixel point relative to the corresponding second image block, whether the pixel point in the image frame to be detected is a pixel point within the static identification area.

In a specific implementation, the local confidence identification, includes at least one of a similarity local confidence identification, a motion vector local confidence identification, and a motion vector consistency local confidence identification; and the local confidence information of the corresponding pixel point relative to the corresponding second image block, includes at least one of a similarity local confidence, a motion vector local confidence, and a motion vector consistency local confidence.

In an embodiment of the present invention, the detection unit 504, adapted to set the similarity local confidence identification of the corresponding pixel points to a first value when it is determined that the similarity calculation of the corresponding first similar image block, second similar image block and third similar image block is reliable, and otherwise, to set the similarity local confidence identification of the corresponding pixel points to a second value.

In an embodiment of the present invention, the detection unit 504, adapted to set the motion vector local confidence identification of the corresponding pixel point to a third value when it is determined that the motion vector calculation of the corresponding first motion vector, second motion vector and third motion vector is reliable, otherwise, to set the motion vector local confidence identification of the corresponding pixel point to a fourth value.

In an embodiment of the present invention, the detection unit 504, adapted to set the motion vector consistency local confidence of the corresponding pixel point to a fifth value when the direction of the corresponding first motion vector, second motion vector and third motion vector is consistent, otherwise, to set the motion vector consistency local confidence identification of the corresponding pixel point to a sixth value.

In an embodiment of the present invention, the detection unit 504, adapted to calculate the similarity local confidence, motion vector local confidence and motion vector consistency local confidence of the corresponding pixel points relative to the corresponding second image block based on the similarity local confidence identification, motion vector local confidence identification and motion vector consistency local confidence identification of all pixel points within the corresponding second image block, to calculate a first contribution score, a second contribution score and a third contribution score corresponding to the similarity local confidence, motion vector local confidence and motion vector consistency local confidence, respectively; to calculate the recognition score of the corresponding pixel point based on the calculated first contribution score, second contribution score and third contribution score, to identify the corresponding pixel point as a pixel in the non-static identification area when the calculated recognition score is less than a pre-determined recognition threshold.

In an embodiment of the present invention, the detection unit 504 is adapted to obtain the similarity local confidence identification of ail pixel points in the corresponding second image block, respectively, and to place the obtained similarity local confidence identification of all pixel points in the corresponding second image block at the position of the corresponding pixel point, respectively, to form a corresponding first identification matrix; to perform a dot product and summation operation on the corresponding first identification matrix and a first identification template to obtain the similarity local confidence of the pixel point relative to the corresponding second image block.

In an embodiment of the present invention, the detection unit 504 is adapted to obtain the motion vector local confidence identification of all pixel points in the corresponding second image block respectively, and to place the obtained motion vector local confidence identification of all pixel points in the corresponding second image block at the position of the corresponding pixel point to form a corresponding second identification matrix; to perform a dot product and summation operation on the corresponding second identification matrix and the second identification template to obtain the motion vector local confidence of the corresponding pixel point relative to the corresponding second image block.

In an embodiment of the present invention, the detection unit 504 is adapted to obtain the motion vector consistency local confidence identification of all pixel points in the corresponding second image block, and to place the obtained motion vector consistency local confidence identification of all pixel points in the corresponding second image block at the position of the corresponding pixel point to form a corresponding third identification matrix; and to perform a dot product and summation operation on the corresponding third identification matrix and the third identification template to obtain the motion vector consistency local confidence of the corresponding pixel point relative to the corresponding second image block.

In an embodiment of the present invention, the detection unit 504, adapted to set the corresponding first contribution score to a pre-determined seventh value when live similarity local confidence of the corresponding pixel point is less than a pre-determined first similarity local confidence threshold; to set the corresponding first contribution score to an eighth value when the similarity local confidence of the corresponding pixel point is greater than or equal to the first similarity local confidence threshold and less than a pre-determined second similarity local confidence threshold; to set the corresponding first contribution score to a ninth value when the similarity local confidence of the corresponding pixel point is greater than or equal to the second similarity local confidence threshold.

In an embodiment of the present invention, the detection unit 504, adapted to set the corresponding second contribution score to a tenth value when the motion vector local confidence of the corresponding pixel point is less than a pre-determined first motion vector local confidence threshold; to set the corresponding second contribution score to an eleventh value when the motion vector local confidence of the corresponding pixel point is greater than or equal to the first motion vector local confidence threshold and less than a pre-determined second motion vector local confidence threshold; to set the corresponding second contribution score to a twelfth value when the motion vector local confidence of the corresponding pixel point is greater than or equal to the second motion vector local confidence threshold.

In an embodiment of the present invention, the detection unit 504, adapted to set the corresponding third contribution score to a thirteenth value when the motion vector consistency local confidence of the corresponding pixel point is less than a pro-determined first motion vector consistency local confidence threshold; to set the corresponding third contribution score to a thirteenth value when the motion vector consistency local confidence of the corresponding pixel point is greater than or equal to the first motion vector consistency local confidence threshold and less than a second motion vector consistency local confidence threshold, and to set the corresponding third contribution score to a fifteenth v value when the motion vector consistency local confidence of the corresponding pixel is greater than or equal to the second motion vector consistency local confidence threshold.

In an embodiment of the present invention, the detection unit 504, adapted to obtain a weighted sum of the corresponding first contribution score, second contribution score and third contribution score, as the recognition score of the corresponding pixel point.

Correspondingly, embodiments of the present invention also provide a chip on which a static identification area detection module is integrated as described. Among them, the static identification area detection module, please refer to the introduction of the aforementioned section, and will not repeat.

Correspondingly, embodiments of the present invention also provide an electronic device that can perform the static identification area detecting method described above in the form of a loaded program.

Figure 6:
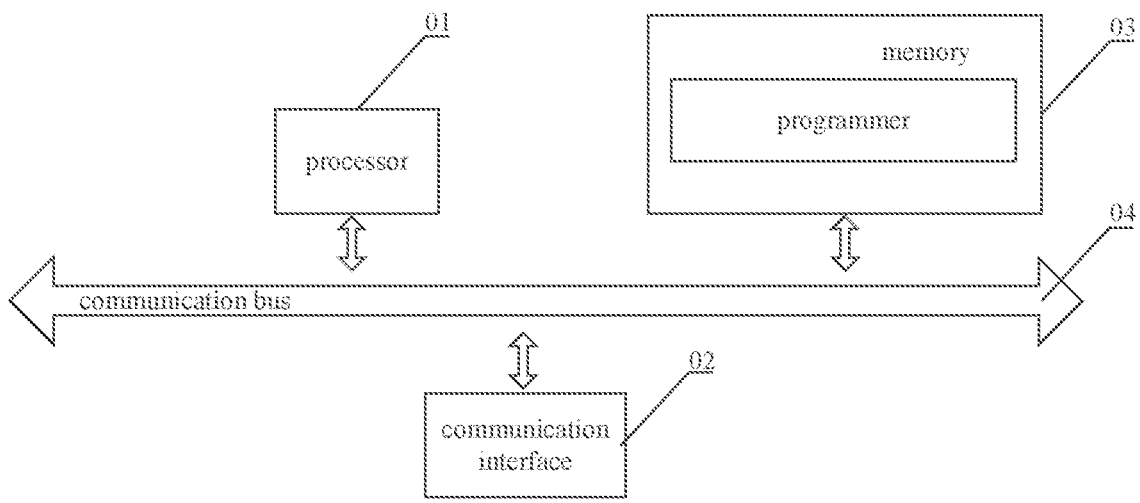
FIG. 6 shows a hardware structure of an electronic device provided in an embodiment of the present invention.

An optional hardware structure of the electronic device provided by an embodiment of the present invention may be shown in FIG. 6 and includes: at least one processor 01, at least one communication interface 02, at least one memory 03 and at least one communication bus 04.

In the embodiments of the invention, the number of processor 01, communication interface 02, memory 03, and communication bus 04 is at least one, and the processor 01, communication interface 02, and memory 03 complete communication with each other via communication bus 04.

The communication interface 02 could be an interface to a communication module used for network communication, such as an interface to a GSM module.

Processor 01 may be a central processing unit CPU, or an Application Specific Integrated Circuit (ASIC), or one or more integrated circuits configured to implement embodiments of the present invention.

Memory 03 may contain high-speed RAM memory, and may also include non-volatile memory (non-volatile memory), such as at least one disk memory.

Wherein the memory 03 stores one or more computer instructions, the one or more computer instructions being executed by the processor 01 to implement the static identification area detecting method of the embodiment of the present invention.

It should be noted that the electronic device implemented above may also include other devices (not shown) that may not be necessary for the disclosure of embodiments of the present invention; given that these other devices may not be necessary for understanding the disclosure of embodiments of the present invention, embodiments of the present invention are not presented individually in this regard.

Embodiments of the present invention further provide a storage medium, the storage medium storing one or more computer instructions, the one or more computer instructions for implementing the static identification area detecting method provided by embodiments of the present invention.

The embodiments of the present invention described above are combinations of elements and features of the present invention. Unless otherwise mentioned, the elements or features may be considered selective. Each element or feature may be practiced without combining them with other elements or features. Further, embodiments of the present invention may be constructed by combining some of the elements and/or features. The order of operation described in the embodiments of the present invention may be rearranged. Some constructions of any one embodiment may be included in another embodiment find may be replaced by a corresponding construction of another embodiment. It will be apparent to those of skill in the an that claims of the appended claims that are not expressly referenced to each other may be combined in an embodiment of the present invention or may be included as new claims m an amendment after the filing of this application.

Embodiments of the present invention may be implemented by various means such as hardware, firmware, software, or combinations thereof. In hardware configuration means, the methods according to exemplary embodiments of the present invention may be implemented by one or more specialized integrated circuits (ASICs), digital signal processors (DSPs), digital signal processor devices (DSPDs), programmable logic devices (PLDs), field programmable gate arrays (FPGAs), processors, controllers, microcontrollers, microprocessors, and the like.

In a firmware or software configuration approach, implementations of the invention may be implemented in the form of modules, processes, functions, etc. The software code may be stored in a memory unit and executed by a processor. The memory unit is located inside or outside the processor and can send data to and receive data from the processor by various known means.

The above description of the disclosed embodiments enables those ski lied in the art to implement or use the present invention. A variety of modifications to these embodiments will be apparent to those skilled in the art, and the general principles defined herein can be implemented in other embodiments without departing from the spirit or scope of the present invention. Accordingly, the invention will not be limited to these embodiments as shown herein, but conforms to the widest scope consistent with the principles and novel features disclosed herein.

Although the present invention is disclosed as above, the present invention is not limited therein. Any person skilled in the art may make various changes and modifications without departing from the spirit and scope of the present invention, and therefore the scope of protection of the present invention shall be subject to the scope defined by the claims.

What is claimed:

1. A static identification area detecting method for detecting a static identification area in a video image, comprising:

determining a first image block in the image frame to be detected, centered on each pixel point in the image frame to be detected, respectively, and determining a corresponding co-located image block in the next image frame of the image frame to be detected, centered on a co-located pixel point in the next image frame of the image frame to be detected, wherein a coordinate position of the co-located pixel point in the next image frame is the same as a coordinate position of the pixel point in the image frame to be detected;

searching for image blocks similar to the first image block in the previous image frame and the next image frame of the image frame to be detected, respectively, and searching for image blocks similar to the corresponding co-located image block in the image frame to be detected as a corresponding first similar image block, a corresponding second similar image block and a corresponding third similar image block, respectively;

calculating a first motion vector of the first image block pointing to the corresponding first similar image block and a second motion vector of the corresponding first image block pointing to the corresponding second similar image block, respectively, and calculating a third motion vector of the corresponding co-located image block pointing to the corresponding third similar image block;

determining whether the corresponding pixel point in the image frame to be detected is a pixel point within the static identification area based on the corresponding first similar image block, the corresponding second similar image block and the corresponding third similar image block and the first motion vector, the second motion vector and the third motion vector, wherein:

said searching for image blocks similar to the first image block in the previous image frame and the next image frame of the image frame to be detected, respectively, and searching for an image block similar to the corresponding co-located image block in the image frame to be detected, comprises searching for an image block having the minimum sum of absolute differences with the first image block in the previous image frame and next image frame, respectively, and searching for an image block having the minimum sum of absolute differences with the corresponding co-located image block in the image frame to be detected as the corresponding first similar image block, the corresponding second similar image block and the corresponding third similar image block, respectively; and said determining whether the pixel point in the image frame to be detected is a pixel point within the static identification area based on the corresponding first similar image block, second similar image block and third similar image block and the corresponding first motion vector, second motion vector and third motion vector, comprises:
  determining the reliability of the similarity calculation of the corresponding first similar image block, second similar image block and third similar image block, or the reliability of the motion vector calculation of the corresponding first motion vector, second motion vector and third motion vector, or consistency of the directions among the corresponding first motion vector, second motion vector and third motion vector; and
  determining the corresponding pixel point as a pixel point in the non-static identification area when the reliability of the similarity calculation of the corresponding first similar image block, second similar image block and third similar image block confirmed, or the reliability of the motion vector calculation of the corresponding first motion vector, second motion vector and third motion vector confirmed, or the consistency of the direction of the corresponding first motion vector, second motion vector and third motion vector confirmed; otherwise, determining the corresponding pixel point as a pixel point in the static identification area.

2. An electronic device, comprising at least one memory and at least one processor, the memory storing one or more computer instructions, wherein the one or more computer instructions are executed by the processor to implement the detecting method as claimed in claim 1.

3. A non-transitory storage medium, wherein the non-transitory storage medium stores one or more computer instructions for implementing the detecting method as claimed in claim 1.

4. The static identification area detecting method according to claim 1, wherein said determining the reliability of the similarity calculation of the corresponding first similar image block, second similar image block and third similar image block, comprising:
  determining that the similarity calculation of the corresponding first similar image block is reliable when the sum of absolute differences between the corresponding first similar image block and the corresponding first image block is less than a first sum of absolute differences threshold; otherwise, determining that the similarity calculation of the corresponding first similar image block is not reliable;
  determining that the similarity calculation of the corresponding second similar image block is reliable when the sum of absolute differences between the corresponding second similar image block and the corresponding first image block is less than a second sum of absolute differences threshold; otherwise, determining that the similarity calculation of the corresponding second similar image block is not reliable;
  determining that the similarity calculation of the corresponding third similar image block is reliable when the sum of absolute differences between the corresponding third similar image block and the corresponding co-located image block is less than the third sum of absolute differences threshold; otherwise, determining that the similarity calculation of the corresponding third similar image block is not reliable.

5. The static identification area detecting method according to claim 1, wherein said determining the reliability of the motion vector calculation of the corresponding first motion vector, second motion vector and third motion vector, comprising:
  determining that the calculation of the corresponding first motion vector is reliable when the horizontal component of the corresponding first motion vector is greater than a first horizontal component threshold and the vertical component of the corresponding first motion vector is greater than a first vertical component threshold; otherwise, determining that the calculation of the corresponding first motion vector is not reliable;
  determining that the calculation of the corresponding second motion vector is reliable when the horizontal component of the corresponding second motion vector is greater than a second horizontal component threshold and the vertical component of the corresponding second motion vector is greater than a second vertical component threshold; otherwise, determining that the calculation of the corresponding second motion vector is not reliable;
  determining that the calculation of the corresponding third motion vector is reliable when the horizontal component of the corresponding third motion vector is greater than a third horizontal component threshold and the vertical component of the corresponding third motion vector is greater than a third vertical component threshold; otherwise, determining that the calculation of the corresponding third motion vector is not reliable.

6. The static identification area detecting method according to claim 1, wherein said determining the consistency of the direction of the corresponding first motion vector and second motion vector and third motion vector, comprising:
  calculating the sum of the absolute sum of the difference between the horizontal component of the corresponding first motion vector and the corresponding second motion vector, and the absolute sum of the difference between the vertical component of the corresponding first motion vector and the corresponding second motion vector, as a first absolute difference sum;
  calculating the sum of the absolute sum of the difference between the horizontal component of the corresponding first motion vector and the corresponding third motion vector, and the absolute sum of the difference between the vertical component of the corresponding first motion vector and the corresponding third motion vector, as a second absolute difference sum;
  determining that the corresponding first motion vector is consistent with the direction of the second motion vector and the third motion vector when it is determined that the sum of the first absolute difference sum and the second absolute difference sum is less than a absolute difference sum threshold; otherwise, determining that the corresponding first motion vector is not consistent with the direction of the corresponding second motion vector and the corresponding third motion vector.

7. The static identification area detecting method according to claim 1, wherein, after determining the reliability or not of the similarity calculation of the corresponding first similar image block, second similar image block and third similar image block, the reliability or not of the motion vector calculation of the corresponding first motion vector, second motion vector and third motion vector, and the consistency or not of the direction of the corresponding first motion vector, second motion vector and third motion vector, further comprising:
  setting a corresponding local confidence identification for the pixel point in the image frame to be detected based on the information on the reliability of the similarity calculation of the corresponding first similar image block, second similar image block and third similar image block and the reliability of the motion vector calculation of the corresponding first motion vector, second motion vector and third motion vector, and the information on the consistency of the motion vector direction of the corresponding first motion vector, second motion vector and third motion vector;

determining a corresponding second image block in the image frame to be detected, centered on each pixel point in the image frame to be detected;

calculating the local confidence information of the corresponding pixel point relative to the corresponding second image block based on the local confidence identification of all pixel points within the corresponding second image block; the local confidence information is used to identify information on the consistency of the corresponding pixel point with other pixel points within the corresponding second image in the time domain and the spatial domain;

determining whether the pixel point in the image frame to be detected is a pixel point within the static identification area based on the calculated local confidence information of the corresponding pixel point relative to the corresponding second image block.

8. The static identification area detecting method according to claim 7, wherein said local confidence identification, comprising at least one of a similarity local confidence identification, a motion vector local confidence identification, and a motion vector consistency local confidence identification;

the local confidence information of the corresponding pixel point relative to the corresponding second image block, comprising at least one of a similarity local confidence, a motion vector local confidence, and a motion vector consistency local confidence.

9. The static identification area detecting method according to claim 8, wherein setting a corresponding similarity local confidence identification for a corresponding pixel point in the image frame to be detected, comprising:

setting the similarity local confidence identification of the corresponding pixel point to a first value when the reliability of the similarity calculation of the corresponding first similar image block, second similar image block and third similar image block confirmed; otherwise, setting the similarity local confidence identification of the corresponding pixel point to a second value.

10. The static identification area detecting method according to claim 8, wherein setting a corresponding motion vector local confidence identification for a corresponding pixel point in the image frame to be detected, comprising:

setting the motion vector local confidence identification of the corresponding pixel point to a third value when the reliability of the motion vector calculation of the corresponding first motion vector, second motion vector and third motion vector confirmed; otherwise, setting the motion vector local confidence identification of the corresponding pixel point to a fourth value.

11. The static identification area detecting method according to claim 8, wherein setting a corresponding motion vector consistency local confidence identification for a corresponding pixel point in the image frame to be detected, comprising:

setting the motion vector consistency local confidence of the corresponding pixel point to a fifth value when the direction of the corresponding first motion vector, second motion vector and third motion vector is consistent; otherwise, setting the motion vector consistency local confidence identification of the corresponding pixel point to a sixth value.

12. The static identification area detecting method according to claim 8, wherein said determining whether the pixel point in the image frame to be detected is a pixel point within the static identification area based on the calculated local confidence information of the pixel point relative to the corresponding second image block, comprising:

calculating the similarity local confidence, motion vector local confidence and motion vector consistency local confidence of the corresponding pixel point relative to the corresponding second image block based on the similarity local confidence identification, motion vector local confidence identification and motion vector consistency local confidence identification of all pixel points within the corresponding second image block, respectively;

calculating a first contribution score, a second contribution score and a third contribution score corresponding to the similarity local confidence, the motion vector local confidence and the motion vector consistency local confidence, respectively;

calculating the recognition score of the corresponding pixel point based on the calculated first contribution score, the second contribution score and the third contribution score;

identifying the corresponding pixel point as a pixel point in the static identification area when the calculated recognition score is less than a pre-determined recognition threshold.

13. The static identification area detecting method according to claim 12, wherein said calculating the similarity local confidence of the corresponding pixel points relative to the corresponding second image block, comprising:

acquiring the similarity local confidence identification of all pixel points within the corresponding second image block, respectively, and placing the acquired similarity local confidence identification of all pixel points within the corresponding second image block at the corresponding pixel point position, respectively, to form a corresponding first identification matrix; and performing a dot product and summation operation on the corresponding first identification matrix and a first identification template, to obtain the similarity local confidence of the pixel point relative to the corresponding second image block.

14. The static identification area detecting method according to claim 12, wherein said calculating the motion vector local confidence of the corresponding pixel point relative to the corresponding second image block, comprising:

acquiring the motion vector local confidence identification of all pixel points within the corresponding second image block, respectively, and placing the acquired motion vector local confidence identification of all pixel points within the corresponding second image block at the corresponding pixel point position, respectively, to form a corresponding second identification matrix; and performing a dot product and summation operation on the corresponding second identification matrix and a second identification template, to obtain the motion vector local confidence of the corresponding pixel point relative to the corresponding second image block.

15. The static identification area detecting method according to claim 12, wherein said calculating the motion vector consistency local confidence of the corresponding pixel point relative to the corresponding second image block, comprising:

acquiring the motion vector consistency local confidence identification of all pixel points within the corresponding second image block, respectively, and placing the acquired motion vector consistency local confidence identification of all pixel points within the corresponding second image block at the corresponding pixel point position, respectively, to form a corresponding third identification matrix; and performing a dot product and summation operation on the corresponding third identification matrix and a third identification template, to obtain the motion vector consistency local confidence of the corresponding pixel point relative to the corresponding second image block.

16. The static identification area detecting method according to claim 12, wherein said calculating a first contribution score corresponding to the similarity local confidence, comprising:

setting the corresponding first contribution score to a pre-determined seventh value when the similarity local confidence of the corresponding pixel point is less than a pre-determined first similarity local confidence threshold;

setting the corresponding first contribution score to an eighth value when the similarity local confidence of the corresponding pixel point is greater than or equal to the first similarity local confidence threshold and less than a pre-determined second similarity local confidence threshold;

setting the corresponding first contribution score to a ninth value when the similarity local confidence of the corresponding pixel point is greater than or equal to the second similarity local confidence threshold.

17. The static identification area detecting method according to claim 12, wherein said calculating a second contribution score corresponding to the motion vector local confidence, comprising:

setting the corresponding second contribution score to a tenth value when the motion vector local confidence of the corresponding pixel point is less than a pre-determined first motion vector local confidence threshold;

setting the corresponding second contribution score to an eleventh value when the motion vector local confidence of the corresponding pixel point is greater than or equal to the first motion vector local confidence threshold and less than a pre-determined second motion vector local confidence threshold;

setting the corresponding second contribution score to a twelfth value when the motion vector local confidence of the corresponding pixel point is greater than or equal to the second motion vector local confidence threshold.

18. The static identification area detecting method according to claim 12, wherein said calculating a third contribution score corresponding to the motion vector consistency local confidence, comprising:

setting the corresponding third contribution score to a thirteenth value when the motion vector consistency local confidence of the corresponding pixel point is less than a pre-determined first motion vector consistency local confidence threshold;

setting the corresponding third contribution score to a fourteenth value when the motion vector consistency local confidence of the corresponding pixel point is greater than or equal to the first motion vector consistency local confidence threshold and less than a pre-determined second motion vector consistency local confidence threshold;

setting the corresponding third contribution score to a fifteenth value when the motion vector consistency local confidence of the corresponding pixel point is greater than or equal to the second motion vector consistency local confidence threshold.

\* \* \* \* \*